Figure 1:
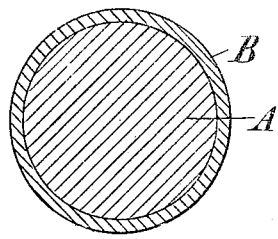

No. 878,070. PATENTED FEB. 4, 1908.
C. T. & E. P. KINGZETT.
PLAYING BALL.
APPLICATION FILED JAN. 21, 1907.

Witnesses
E. B. Franzone
C. F. Early

Inventors
Charles T. Kingzett & Eric P. Kingzett
By their Attorneys
Baldwin Wight

UNITED STATES PATENT OFFICE.

CHARLES THOMAS KINGZETT, OF KENSINGTON, AND ERIC PAUL KINGZETT, OF CATERHAM, ENGLAND.

PLAYING-BALL.

No. 878,070.   Specification of Letters Patent.   Patented Feb. 4, 1908.

Application filed January 21, 1907. Serial No. 353,342.

*To all whom it may concern:*

Be it known that we, CHARLES THOMAS KINGZETT, F. I. C., F. C. S., chemical manufacturer, residing at 1 Thornton street, Kensington, in the county of Middlesex, England, and ERIC PAUL KINGZETT, chemical manufacturer, residing at Aldercombe, Harestone Valley, Caterham, in the county of Surrey, England, have invented new and useful Improvements in Playing-Balls, of which the following is a specification.

It is a well known chemical fact that when such substances as gelatin are dissolved in water by the aid of heat to a sufficient extent, the resulting solutions solidify upon cooling to a more or less gelatinous and elastic condition.

In common with gelatin, the following and other colloid substances behave similarly, viz., agar agar, glue, isinglass, Irish moss, gum tragacanth, gum arabic, albumen soap and starch.

According to this invention we employ such substances as cores or parts of cores for golf and other balls, such cores being incased in shells of gutta percha or other suitable material, or they may be first of all incased in hollow balls or envelops or foldings of either non-vulcanized or vulcanized rubber or other substances and may be prepared with or without a central nucleus of other material. The parts thus built up are afterwards incased with a shell of gutta percha, balata, or other suitable material in the manner that is well understood in the trade. When a nucleus is employed it is dipped into a suitably prepared solution, and when the adhering part has congealed it is again dipped and cooled, repeating the operation until the required thickness has been obtained. Or the colloid material may be first of all prepared in thin sheet or tape form, and then be wrapped round the parts which are to be incased.

Cores may be prepared by pouring the solution into molds of half-balls (with or without a hollow center) and the two half-spheres which are obtained on congelation are placed together, preferably heating or moistening the two faces so as to secure cohesion, and then subsequently infolded or incased as hereinbefore described. Or hollow balls of rubber or gutta percha or skin or other suitable material may be filled with the liquid which will afterwards congeal in them.

When soap is used it is not employed in the dry or desiccated state, but in association with water as a constituent.

We prefer substances of a gelatinous, albuminous or gummy nature, and when these are employed instead of using pure or ordinary water as a solvent or admixture, a proportion of alcohol, treacle, honey or glycerin or other liquid may be used, in addition, with the object of keeping the core in a soft or plastic or mobile condition. Again when substances of a gelatinous nature are used for making the cores they may be exposed to the vapor of formaldehyde or temporarily immersed in a solution of that substance, so as to prevent the cores from passing at any time into a putrefactive or decomposing state, and to render the colloid mass insoluble in water. Albumen may be used in the form of coagulated blood serum or white of egg or small birds eggs may be coagulated by heat and used as cores.

The cores may be employed of varying size and, at any rate when the cores are made large or extremely mobile in character, it is necessary or desirable (in the case of golf balls) to protect the cores with wrappings of rubber or other material before the external shells are placed on the balls, so that when the finished balls are played with, the inner cores, while susceptible of distortion by the impact of the clubs, may resume their spherical form without fracture of the said shells.

We find that the golf balls, cores of from $\frac{7}{8}$ths inch to 1 inch in diameter are appropriate in size, and when gelatin dissolved in water (with or without other added liquid) is used to form the cores, a solution of from 50% to 75% strength is a convenient one to employ. A solution of 50% strength may be usefully made by dissolving 4 ounces gelatin in 3 ounces of water or sugar water and 1 ounce of glycerin. A core of $\frac{7}{8}$ths inch made of this mixture weighs about 110 grains, but of course when a stronger solution is used the core will weigh more and when a weaker solution is used the core will weigh less. Much weaker solutions may be used, such as a 3% solution of agar agar for example, if desired, but whether weaker or stronger solution or admixtures be used, if it be desired to make golf balls of such specific gravity that they will float in water, the details of their construction as a whole must be varied accordingly in ways that are well understood by golf ball manufacturers.

We do not claim the use of liquids as cores for golf and other balls whether such liquids be solutions of colloids or otherwise but only the use of substances existing in the colloid state.

To preserve the central cores in a mobile condition they may be coated with varnish or with pure rubber dissolved in a solvent, or with collodion or other equivalent material before incasing them as described. This treatment effectually prevents the loss of moisture, thus preserving the colloidal cores in a mobile state.

The following are examples of golf balls made according to this invention.

Figures 1 to 6 show sections of balls made according to this invention

In Fig. 1 A is a large core of comparatively stiff colloidal body incased in external shell B of gutta percha or similar material.

Figure 2:
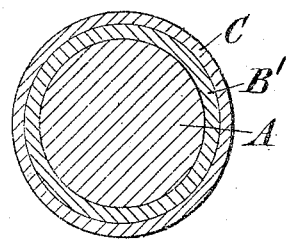

In Fig. 2 A is a core of colloidal body incased in protective covering or wrapping B′, of india rubber or similar material the whole being incased in an external shell C of gutta percha or the like.

Figure 3:
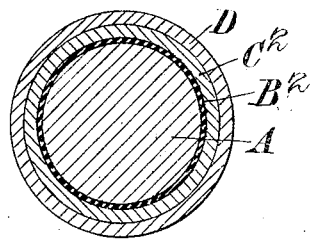

In Fig. 3 A is a core of colloidal body contained within a spherical bag of any suitable fabric shown by the thick line B² surrounded by wrappings of vulcanized or non-vulcanized rubber or other material C², the whole being incased in an external shell D of gutta percha or the like.

Figure 4:
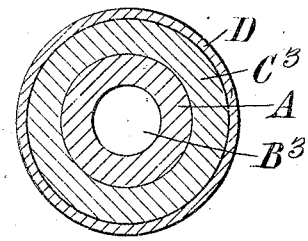

In Fig. 4 A is a core of colloidal body having a hollow center B³ and surrounded by wrappings of rubber or other protective material C³, the whole being incased within the external shell D of gutta percha or equivalent material.

Figure 5:
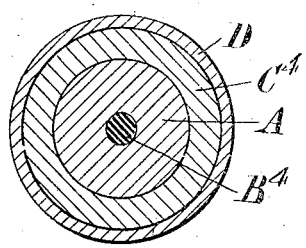

In Fig. 5 A is the core of colloidal body having a solid nucleus B⁴ of wood, gutta percha or of similar material contained at the center and surrounded by wrappings or coverings of rubber or other suitable material C⁴, the whole being incased in the external shell D of gutta percha or other suitable material.

Figure 6:
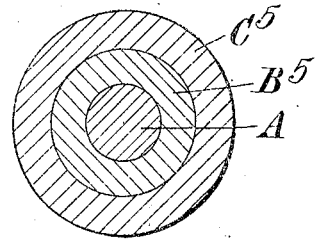

Fig. 6 shows a section of a ball made up of a ⅞ths inch core of colloidal gelatin A, contained within rubber windings B⁵ prepared as described in C. T. Kingzett's specification of Patent No. 734888 and having an external shell C⁵ of gutta percha or other suitable material.

What we claim is:—

1. A ball consisting of a core formed of a colloid body in a gelatinous condition and a covering or shell therefor.

2. A ball consisting of a core formed of a mixture of a colloid body and water, such mixture being in a gelatinous condition and a covering or shell therefor.

3. A ball consisting of a core formed of a colloid body in a gelatinous condition, a layer of india rubber surrounding the core and a covering or shell of gutta percha surrounding the rubber.

CHARLES THOMAS KINGZETT.
ERIC PAUL KINGZETT.

Witnesses:
CHARLES EDWARD RUSSELL,
C. W. HARRIS.